United States Patent
Essenwanger (12) 
(10) Patent No.: US 6,674,380 B1
(45) Date of Patent: Jan. 6, 2004

(54) DIGITAL-PHASE TO DIGITAL AMPLITUDE TRANSLATOR WITH FIRST BIT OFF PRIORITY CODED OUTPUT FOR INPUT TO UNIT WEIGHED DIGITAL TO ANALOG CONVERTER

(75) Inventor: Kenneth Alan Essenwanger, Walnut, CA (US)

(73) Assignee: Raytheon Company, Lexington, MA (US)

( * ) Notice: Subject to any disclaimer, the term of this patent is extended or adjusted under 35 U.S.C. 154(b) by 172 days.

(21) Appl. No.: 10/290,943

(22) Filed: Nov. 8, 2002

(51) Int. Cl.$^7$ ................................................. H03M 1/62
(52) U.S. Cl. ...................... 341/138; 341/144; 341/154; 341/127; 341/110
(58) Field of Search ................................. 341/138, 154, 341/127, 110, 108, 155

(56) References Cited

U.S. PATENT DOCUMENTS

| | | | | |
|---|---|---|---|---|
| 3,877,026 A | * | 4/1975 | Wintz et al. | 341/138 |
| 3,882,484 A | * | 5/1975 | Brokaw et al. | 341/138 |
| 3,883,864 A | * | 5/1975 | Thomas | 341/138 |
| 4,215,247 A | * | 7/1980 | Lambert | 341/138 |
| 4,419,657 A | * | 12/1983 | Gagnon | 341/138 |
| 4,532,495 A | * | 7/1985 | Gagnon | 341/138 |

* cited by examiner

Primary Examiner—Michael Tokar
Assistant Examiner—Lam Mai
(74) Attorney, Agent, or Firm—Leonard A. Alkov; Glenn H. Lenzen, Jr.

(57) ABSTRACT

Differential heating is avoided by a digital to analog converter for generating analog cyclical waveforms having a period. The cyclical waveforms are generated by conversion of a sequence of step wise linearly incrementing digital phase words presented during the period for conversion. The digital to analog converter has a clock for operating conversion timing within the digital to analog converter. The clock generates a clock pulse for conversion of each of the digital phase words by said digital to analog converter while generating the cyclical waveform.

A lookup read only memory for converting each of the incrementing digital phase words within the period into a plurality of ON commands to be used by a plurality of current sources. The plurality of ON commands are timed to generate the cyclical waveforms and have nearly equal time duration approximating a 50 percent duty cycle.

The cyclical waveform has one or more non-linear portions reflected in the content of the read only memory.

10 Claims, 8 Drawing Sheets

DIGITAL-PHASE TO DIGITAL AMPLITUDE TRANSLATOR WITH FIRST BIT OFF PRIORITY CODED OUTPUT FOR INPUT TO UNIT WEIGHED DIGITAL TO ANALOG CONVERTER

This invention was made with Government support under Contract No. N00019-98-C-0003 awarded by the Department of the Navy. The Government has certain rights to this invention.

BACKGROUND OF THE INVENTION

1. Field of Invention

This invention relates to the field of digital to analog converters (DACs) operating at intermediate or radio frequencies often used in direct digital synthesizers or for comparators and DACs in the feedback path of Analog to Digital Converters (ADCs).

2. Description of the Related Art

DACs convert a digital input, for example an 8 bit word, to an analog voltage amplitude. A digital 8 bit word such as 10101010 is converted by a DAC to its analog equivalent. The actual amplitude corresponding to an input such as 10101010 is relative to the maximum amplitude, or full scale, for a particular system.

One requirement of DAC conversion is that linearity be preserved over time as well as over the full conversion range. Linearity means that the analog signal amplitude output from the DAC will be exactly 1/(256−1) of full scale higher for a digital input of 10101011 as compared to an input of 10101010, or between any other digital inputs separated by one (least significant) bit. Another aspect of linearity is that the output voltage generated by a digital input of 01111111 should be half of the maximum voltage generated by a digital input of 11111111. For good linearity, the voltage output of the DAC should follow a straight line as the digital input goes from 00000000 to its maximum 11111111.

One typical approach of converting a digital word into an analog amplitude is to activate switches, typically transistors, within the DAC for each of the "1" bits presented from the input binary digital word. In one implementation, each transistor switch connects a current source feeding an R/2R branch of a resistive ladder. The resulting current from a plurality of R/2R branches is fed into a current to voltage converter to obtain the output voltage of the DAC corresponding to the digital input.

An alternate method of conversion is to have (256−1) unit weighted current sources switched in response to a digital input to a current summer and current to voltage converter. If the characteristics of each of the (256−1) current sources is well controlled, the DC linearity, matched dynamic or transient response is improved.

Using a R/2R resistor, or thermometer coded or unit weighted methods of current summation for digital input to voltage conversion creates errors. One source of error is self heating of each of the transistor switches activated by the digital input words. As the frequency of digital to analog conversion increases, self heating becomes more prevalent as a source of error. This error is further aggravated during the generation of symmetrical waveforms, such as sine or triangle waves typically used in digital frequency synthesizers. In generating such symmetrical waveforms, the ON time of certain digital input bits descriptive of the sine and triangle waves will have a larger duty cycle as compared to other input bits. In effect, some of the transistor switches activated by the digital inputs will stay on longer than others. This longer on time will induce self heating in some transistor switches, but less in others. Because of this differential self heating, some transistors will operate at a different temperature, thus operating point, introducing errors in the Digital to Analog conversion process. The thermal dependence of transistor parameters on temperature is well known.

With the reduction of transistor size due to high frequency operation, thermal resistance from the transistor heat source to a heat sink is increased. This reduction in the path of heat dissipation further aggravates the differential self heating. With increasing operating frequency, as the temperatures of switching transistors increases, so does the differential self heating among switching transistors forming a DAC. As a consequence, undesirable non-linear, temperature dependent operation is encountered.

In the prior art, one approach to differential heating has been achieved by reducing the power dissipation in the switching transistors. This limits the dynamic range or signal to noise ratio because the signal level at the DAC output is reduced.

Yet another approach in thermometer coded or unit weighted (unary) weighted current switches is to use matched transistors having matched $V_{BE}$ voltages for DAC switches thereby reducing the effect of differential self heating. Typically, paralleling requires binary to thermometer decode logic ahead of the DAC current switches. For an 8 bit DAC, (256−1) transistors are required to equally share the current load. The 256−1 current switches tend to reduce differential heating because of the similarity of transistor structures. This takes up chip real-estate as the number of bits of resolution increases.

For high resolution DACs, the binary input word is often partitioned into two sub-words, a most significant word (MSW) and a Least Significant Word (LSW). The MSW uses thermometer code while the LSW uses R-2R binary code.

Yet another approach to provide self heating compensation uses $V_{BE}$ differential control of the operating point of the switching transistors so as to offset the errors due to self heating. This type of complex analog circuitry increases parts count as a tradeoff for better self heating compensation while still subject to matching limitations.

All above methods for reducing the effects of differential heating are analog in nature and have side effects that are undesirable reducing DAC speed and linearity.

SUMMARY OF THE INVENTION

Differential heating is avoided by a digital to analog converter for generating analog cyclical waveforms having a period. The cyclical waveforms are generated by conversion of a sequence of step wise linearly incrementing digital phase words presented during the period for conversion. The combination of digital logic with a DAC is often used with a Direct Digital Synthesizer or a waveform generator.

The digital to analog converter for cyclical wave applications comprises:
  a) A clock for operating conversion timing within the digital to analog converter. The clock generates a clock pulse for conversion of each of the digital phase words by said digital to analog converter while generating the cyclical waveform.
  b) A lookup read only memory for converting each of the incrementing digital phase words within the period into a plurality of ON commands to be used by a plurality of current sources, said plurality of ON commands timed to generate said cyclical waveforms, said ON commands having equal time duration.

c) A first exclusive - OR circuit having a first input, a second input and an output, said first input connected to said sequence of ON commands from said lookup table, said sequence of ON commands generated using a second exclusive OR circuit and a unary decoder, said second input connected to said incrementing digital phase words, said output connected to a register buffer.

d) The register buffer is for storing said output from said exclusive - OR circuit for the duration of each clock cycle.

e) The register buffer drives the current sources thereby activating each of the current sources for equal time intervals during the period.

f) A summer for summing the current sources into a sum of currents.

g) A current to voltage converter for converting the sum of currents into an output voltage, the output voltage generating said cyclical waveform.

The cyclical waveform has one or more non-linear portions reflected in the content of the read only memory.

The invention applies to unary and R-2R partitioned DACs without loss of generality.

DETAILED DESCRIPTION

In teaching away from the prior art, this invention introduces the notion of using digital means of correcting self heating effects of switching transistors internal to DACs, instead of the customary analog means.

Figure 1:
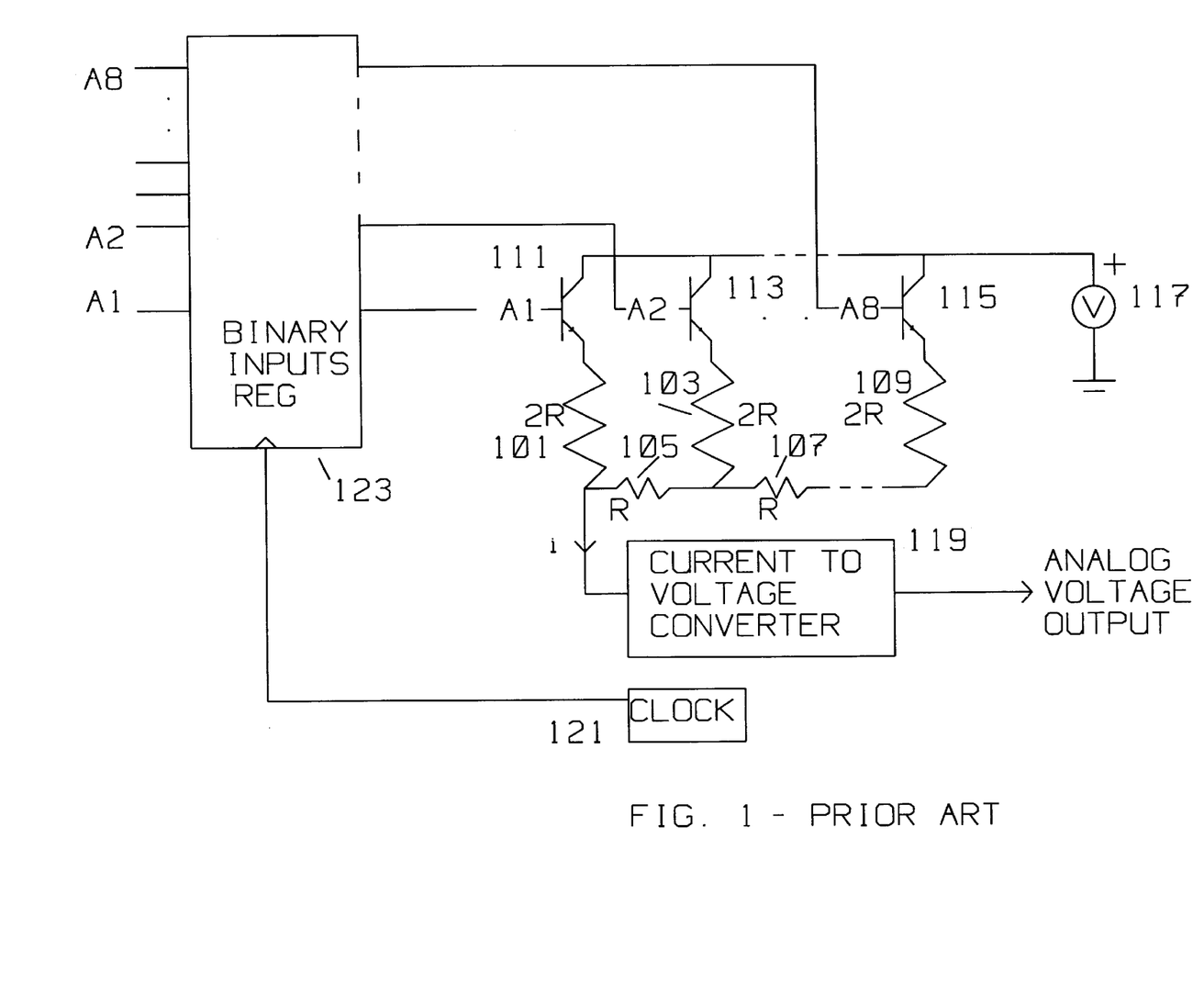
FIG. 1 is an exemplary structure of an R-2R type DAC of the prior art.

FIG. 1 shows an abbreviated schematic of a typical 8 bit R-2R type DAC of the prior art. Transistor switches 111, 113 . . . 115 switch voltage 117 in response to binary digital inputs A1, A2, . . . A8 respectively available from Binary Inputs Register 123. The voltage impressed by switching transistors 111, 113 . . . 115 is converted using resistor 101, 103, 105, 107, 109 into currents. Resistors 101, 103 and 109 are of value 2R, where the value R is chosen to optimize manufacturing preferences and limitations. Similarly, resistors 105 and 107 are of value R. Ignoring imperfections in the circuit, and assuming a perfect voltage source 117, the total current i representing the sum of currents flowing from switching transistors 111, 113 . . . 115 supplied to Current to Voltage converter 119 will be proportional to the binary digital input A1, A2 . . . A8. Thus, the binary digital input A1, A2 . . . A8 is linearly converted to a corresponding analog voltage.

Clock 121 activates binary Inputs Register 123 to store the values of A1, A2 . . . A8 and present them on the next clock cycle to the switching transistors 111, 113 . . . 115. The output from Binary Input Register 123 is fixed for the duration of one clock cycle thus making the digital input stable for the duration of that clock cycle allowing the corresponding analog value to stabilize.

For a cyclical analog output voltage, such as a sine wave, conduction times for A1 will be different from A2 as compared to A8. Generating such a function is typical of oscillators whose output is cyclical, such as sine-wave oscillators and triangle wave oscillators. To synthesize the sine function from a digital input using the circuit of FIG. 1, requires the conduction time of A1 be larger than the conduction time of A8. A1 is the most significant bit (MSB) and changes slower during a sin(x) half cycle. A2, being less significant than A1, has slightly less duration than A1. A8, the least significant bit (LSB), for this exemplary 8 bit system, is ON more often, but for an interval much less than A1 or A2. Thus, because of the different conduction times during one analog output cycle of the synthesized sin(t) function, the heating in switch 111 is more than switch 113 while switch 115 conducts for brief periods. These different conduction times present a differential heating problem. Switch A1, being on for a relatively longer duty cycle, will operate at a different, higher temperature as compared to A8. Thus, because A1 operates at a different temperature than A8, the characteristics of the DAC of FIG. 1 may suffer in terms of decreased linearity and other parasitics.

Figure 2:
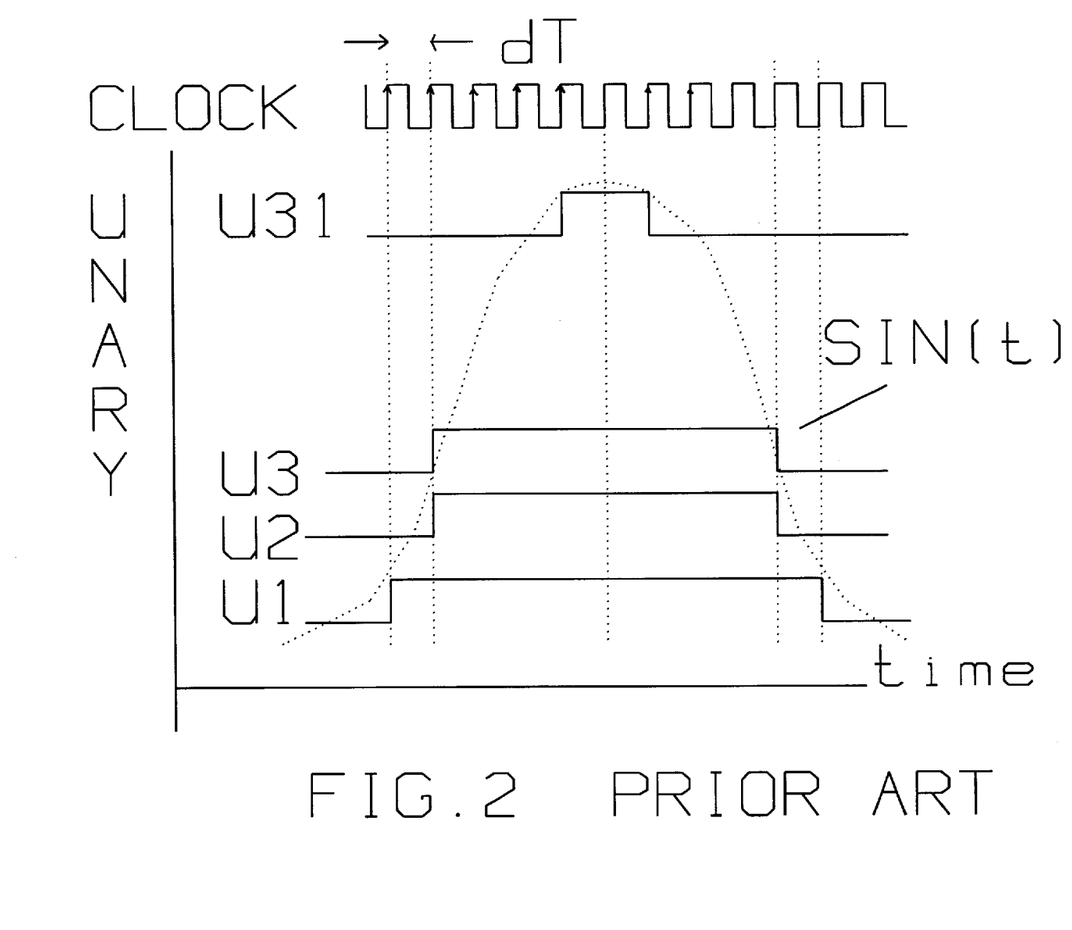
FIG. 2 is an exemplary operation of current switches in a unary type DAC in accordance with FIG. 3 to generate an exemplary cyclical sin(t) function, wherein the duration of conduction for each current switch is different.
Figure 3:
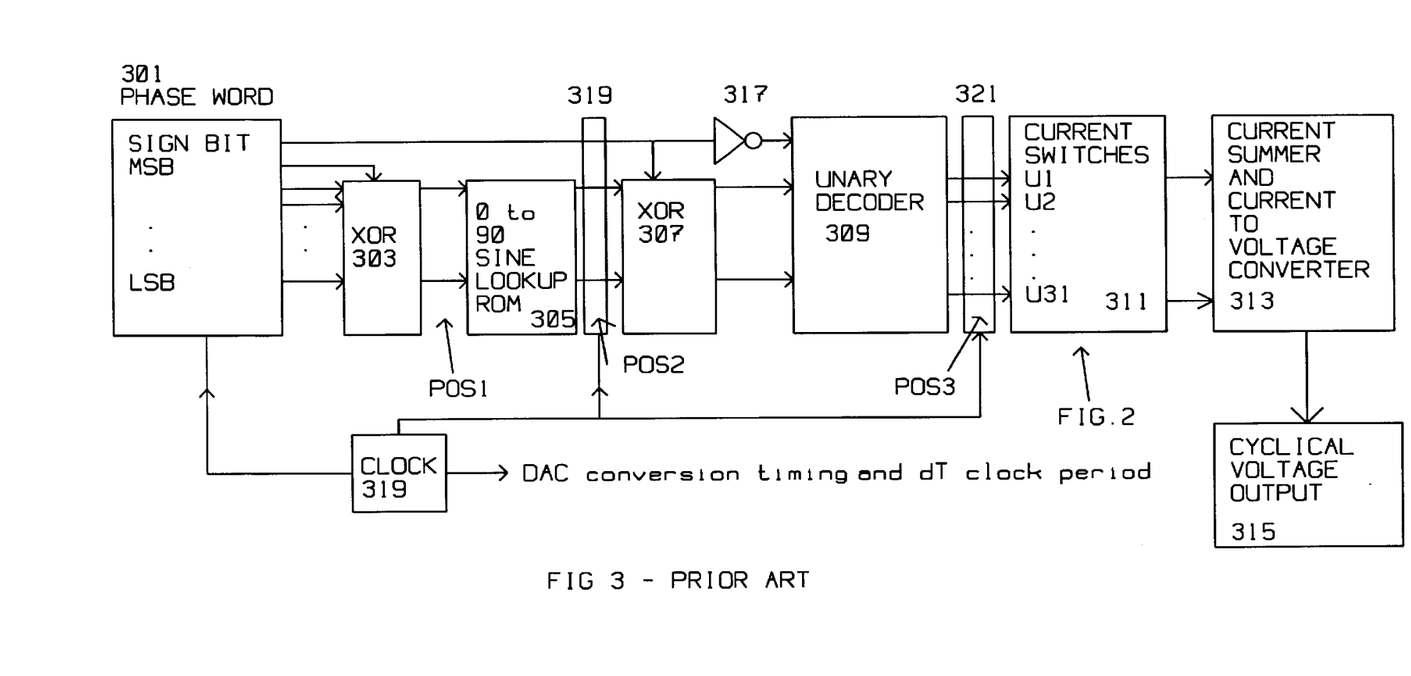
FIG. 3 is another exemplary structure of the prior art using a unary type DAC where current switches have unequal conduction duty cycles shown in FIG. 2.

Contrasting the R-2R type DAC is the unary DAC type of FIG. 3. FIG. 2 shows the ON times for a unary type DAC current sources U1, U2 . . . U31 associated with an exemplary 5 bit DAC operation of FIG. 3. The conduction times shown in FIG. 2 are required to generate an analog voltage output (corresponding to 0 to 360 degrees) of, for example, a sin(t) function. Again, the problem of self heating is apparent as the conduction times of U1 are different as compared to U2 or U31.

In FIG. 3, phase word 301 having a Sign Bit, a MSB, other bits, and an LSB is presented for conversion during one DAC clock cycle. Typically, the number of bits can range from 3 to 20 or more depending on application, desired accuracy, conversion speed etc. The sign bit is presented to inverter 317 as well as exclusive OR (XOR) circuit 307. MSB is presented to XOR 303. The sign bit is applied to unary decoder 309. Lookup read only memory (ROM) 305 stores the non-linear portions of the sine wave output over the interval 0 to 90 degrees. The flow is based on multiple DAC clock cycles. A phase word 301 is presented, it's equivalent value is looked up in the ROM 305 in conjunction with XOR 303, the resulting values are applied to unary decoder 309 using XOR 307, current switches U1–U31 in 311 are activated. The currents are summed and converted to a voltage in 313. The cyclical output voltage is put together from the stream of outputs from 313 by cyclical voltage output 315. Thus, advantageously no storage is required of all the outputs from 313 to create the output voltage. The DAC clock cycle is determined by clock 319, which controls the DAC conversion timing and is also typically used in timing of the digital words as propagated in the digital circuitry.

Figure 4:
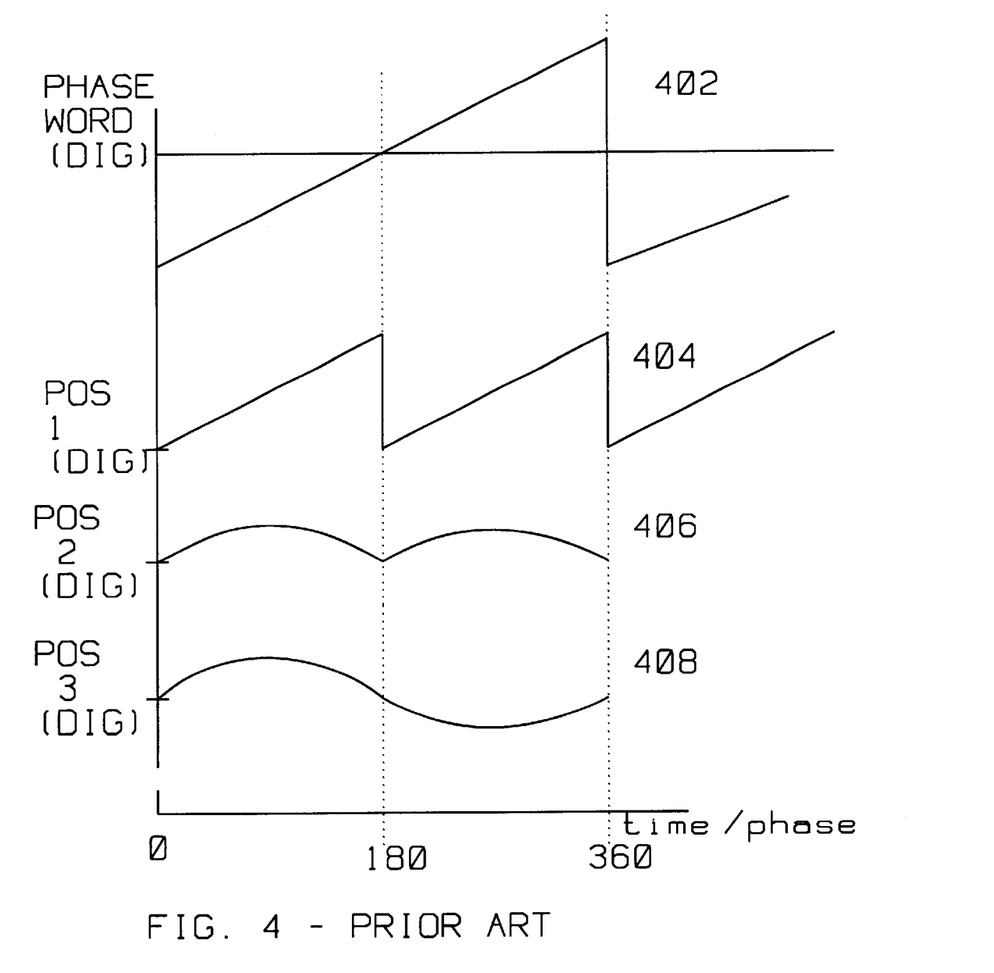
FIG. 4 is a diagram of the signals of the prior art present in FIG. 3.

FIG. 4 shows the waveforms encountered in FIG. 3. 402 shows the monotonically increasing digital value of the phase words. The digital phase word increases for 360 degrees, covering the range from 00000000 to 11111111 when using full scale. At 360 degrees, it resets back to 00000000, or nearly so. At POS1, 404, the output of XOR 303 combines the MSB with the other bits, effectively resetting every 180 degrees. This reduces the amount of storage needed in ROM 305. The output from ROM 305 in shown in the digital output POS 2, 406. The output from ROM 305 is combined by XOR 307, then further combined within unary decoder 309 to drive current switches U1, U2 . . . U31 to generate the non-linear portions of the sample sin(t) function. POS 3 gives the digital values 408 seen by switches U1, U2 . . . U31 in FIG. 3 of the prior art.

Figure 5:
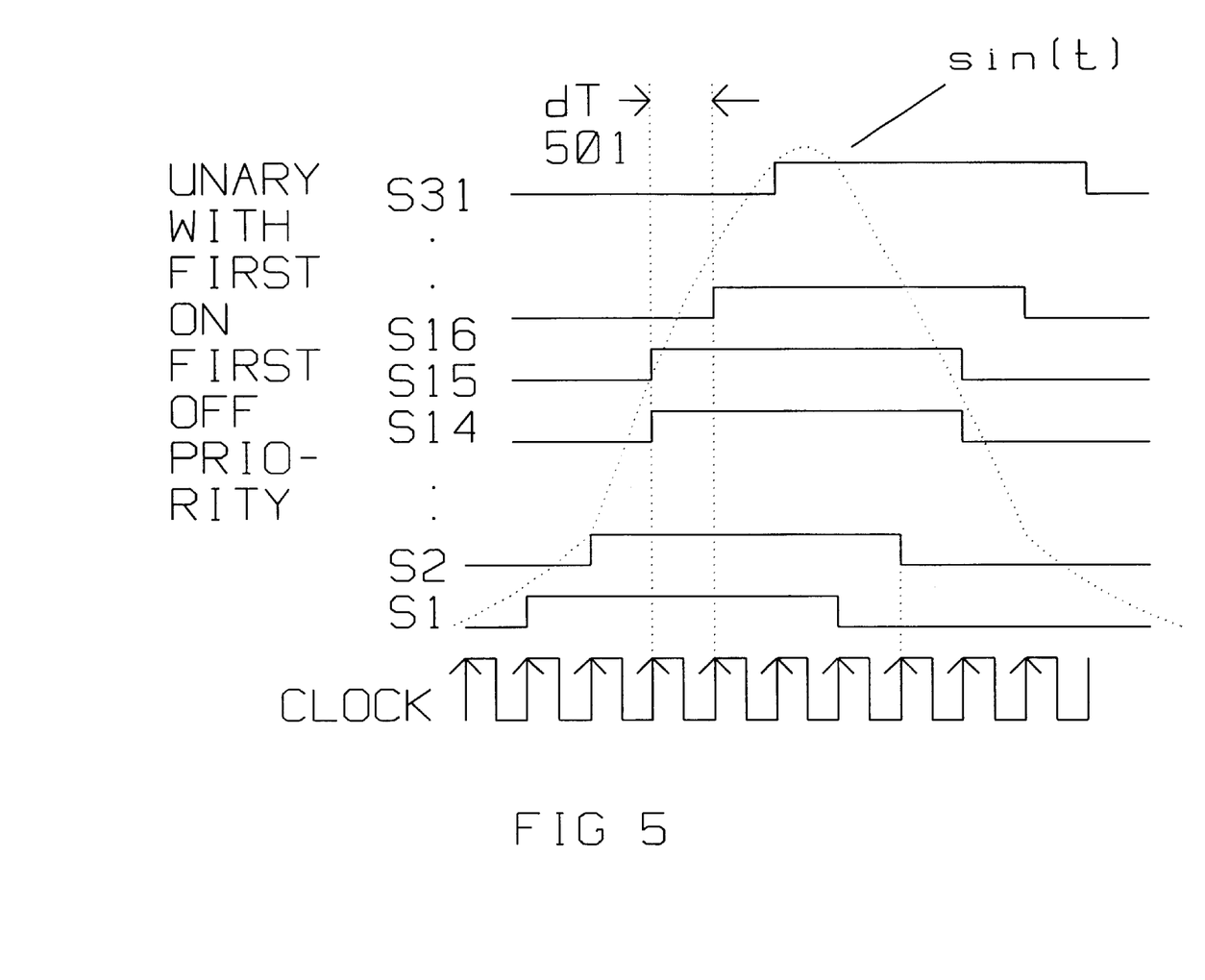
FIG. 5 is a timing diagram of the operation of current switches in accordance with a unary, with First On-First Off priotiy, subject of this invention wherein the duration of conduction for each switch is the same, and approaches a 50 percent duty cycle.
Figure 6:
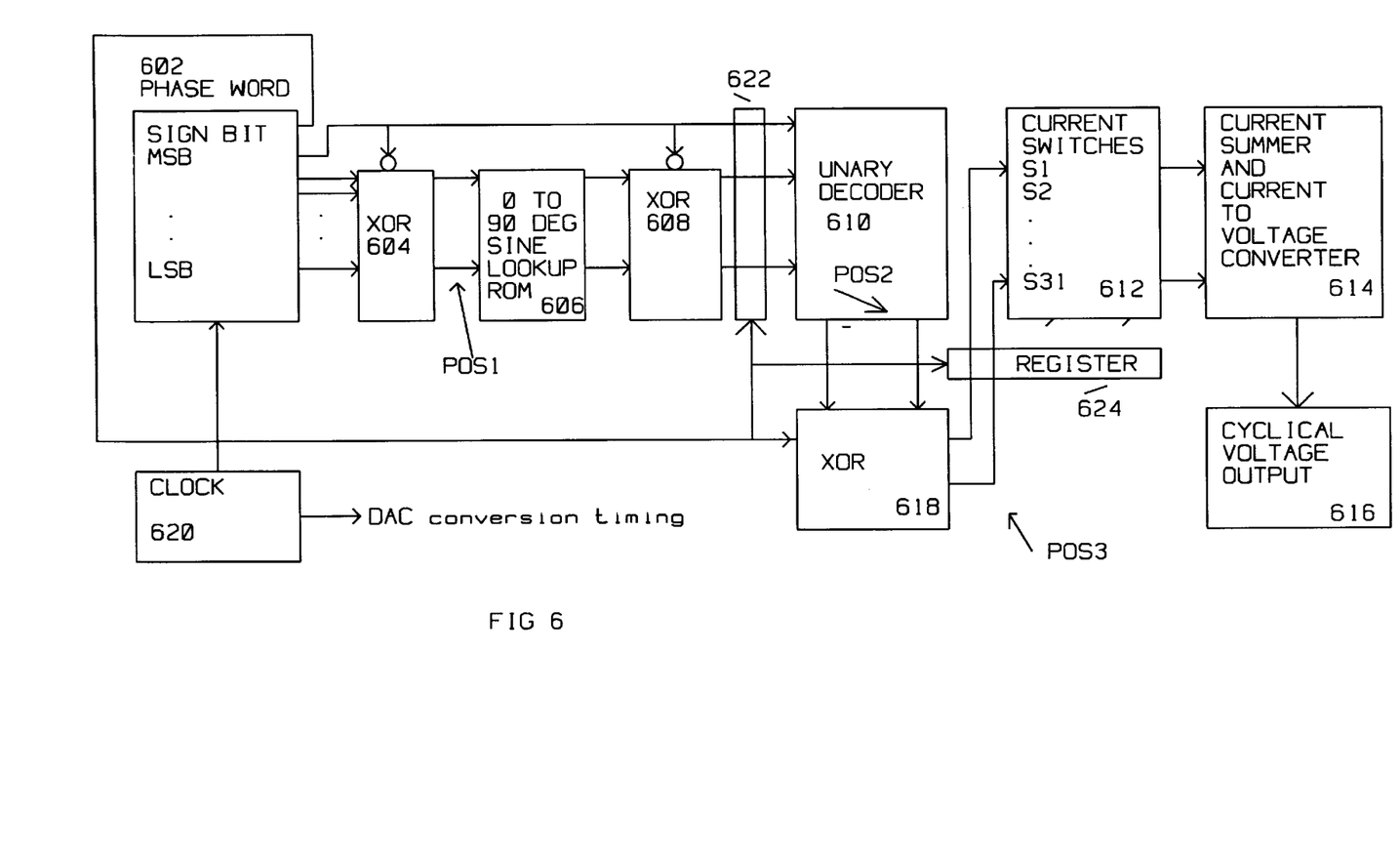
FIG. 6 is the circuit diagram for operating the current switches in accordance with FIG. 5 using a sine lookup ROM.
Figure 7:
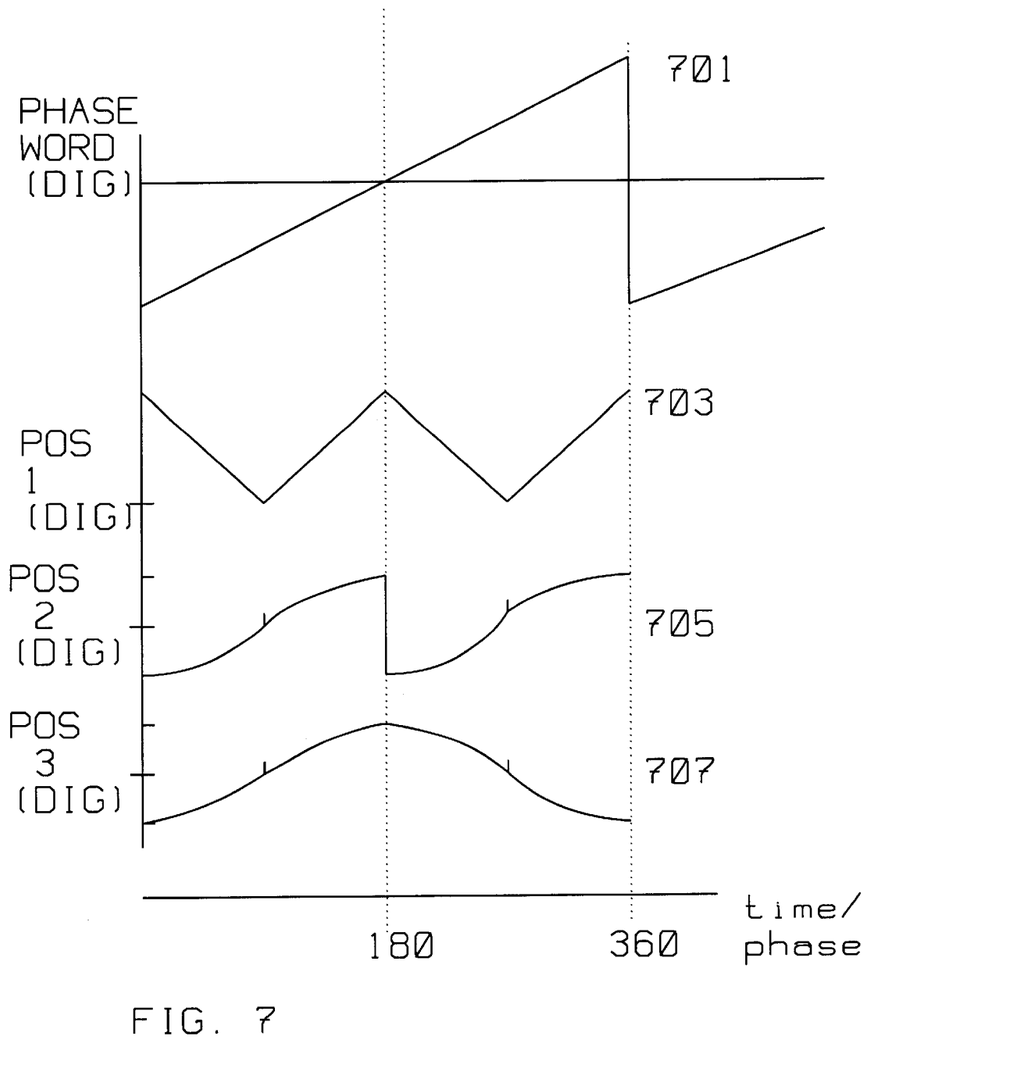
FIG. 7 is a diagram of the signals present within FIG. 6 of the present invention.

In contrast to FIG. 2, FIG. 5 shows the ON times associated with the transistor current switches of FIG. 6 in accordance with the present invention. Each current switch, S1, S2, . . . S31 is ON for a nearly equal time interval, approaching a 50 percent duty cycle. The operation of the switches is a variable interval dT, 501. If equal number of switches are activated for a constant dT, that is each amplitude step is (approximately) equal, then a triangle wave is synthesized. dT is the duration of clock period of clock 620. The number of current switches to be activated for the duration of each dT is computed such that the summation of the current from each switch forms the desired cyclical output, such as the sin(t) function. At the peak of sin(t), typically a maximum number of switches (S1–S31) are on. When sin(t) approaches a minimum, a minimum number are on, preferably all off. The duty cycle of the currents flowing in each current switch S1, S2 . . . S31 are essentially the same, approaching 50 percent duty cycle, reducing errors induced from differential heating in the current switches.

As shown in FIG. 6, phase word 602 sends its sign bit to XOR 618. The MSB is sent to XOR 604 and XOR 608 as well as unary decoder 610. The samples from ROM 606 may be shifted ½ LSB in amplitude and ½ LSB in (digital) phase for better symmetry with the sine wave as the exclusive OR reflect or mirror the lookup values stored in the ROM. The output from XOR 604 drives a sine lookup ROM 606. Lookup ROM 606 stores the non-linearities of the sine wave (or any other cyclical waveform) between 0 and 90 degrees. The output from 606 is combined in XOR 608, and then in unary decoder 610. The output from unary decoder 610 is combined within XOR 618 with the sign bit from phase word 602.

XOR 618 computes the exclusive OR logical expression ⊕ for each of the bits emerging from unary decoder 610, UD1, UD2, . . . UD31 with the sign bit of the phase word SB to generate the signal shown in FIG. 5 for driving current switches S1, S2 . . . S31 in block 612:

$S1=SB \oplus UD1=(SB\hat{}\overline{UD1})+(\overline{SB}\hat{}UD1)$ $S2=SB \oplus UD2$ similarly . . . until $S31=SB \oplus UD31$ The current summer 614 sums the currents and creates the voltage waveform. Thus, the current supplied from current switches S1, S2 . . . S31, as shown in FIG. 5 generate the proper voltage to create the desired sine wave or other, typically cyclical, waveform.

FIG. 6 describes a digital to analog converter for generating cyclical waveforms having a period. The DAC contains a Digital - Phase to Digital Amplitude Translator with First Bit ON, First Bit Off Priority Coded Output. The cyclical waveforms are generated by conversion of a sequence of step wise incrementing digital phase words during the period of the cyclical waveform. The digital to analog converter comprises:

a) A clock 620 for operating the digital to analog converter. The clock generates a clock pulse for conversion of each of the digital phase words by the digital to analog converter while generating the cyclical waveform.

b) A lookup read only memory 606 for converting each of the incrementing digital (amplitude) phase words within each clock period into a plurality of ON commands as shown in FIG. 5, to be used by a plurality of current sources S1, S2 . . . S31 within 612. The plurality of ON commands are timed by the clock to generate the cyclical waveforms. The ON commands have nearly equal time duration and are staggered by the clock timing to accommodate the non-linearities of the cyclical waveform to be converted. For a sine wave, ROM 606 stores information between 0 and 90 degrees.

c) a first exclusive - OR circuit 618, having a first input, a second input and an output, said first input connected to said sequence of ON commands originating from said lookup ROM 606, subsequently combined with MSB by XOR 608 and unary decoder 610. The second input connected to said the sign bit of the incrementing digital phase word. The output of XOR 618 is connected to current switches U1, U2 . . . U31 in buffer 612.

d) the buffer stores the output from the first exclusive - OR circuit 618 for the duration of one clock cycle. The buffer drives the current sources thereby activating each of the current sources approaching equal time intervals during the period of the cyclical waveform.

e) A summer sums the current sources into a sum of currents and a current to voltage converter converts the sum of currents into an output voltage. The sequential generation of the each output voltage in response to each phase word generates the cyclical waveform.

Generally, the digital to analog converter will generate a cyclical waveform having one or more non-linear portions, as reflected in the content of read only memory 606.

In general, ROM 606 need only store information from 0 to 90 degrees if the cyclical waveform is symmetrical. That is, the waveform has an upper portion and a lower portion, where the upper portion is a mirror image of the lower portion. Another choice is to use Octant ROM algorithms as discussed in U.S. Pat. No. 5,774,082, incorporated herein in its entirety by reference.

Intermediate values of digital words may be stored in registers, such as register 622 and register 624. These are driven by clock 620 and provide intermediate storage of intemediate values of digital words internal to the DAC.

Figure 8:
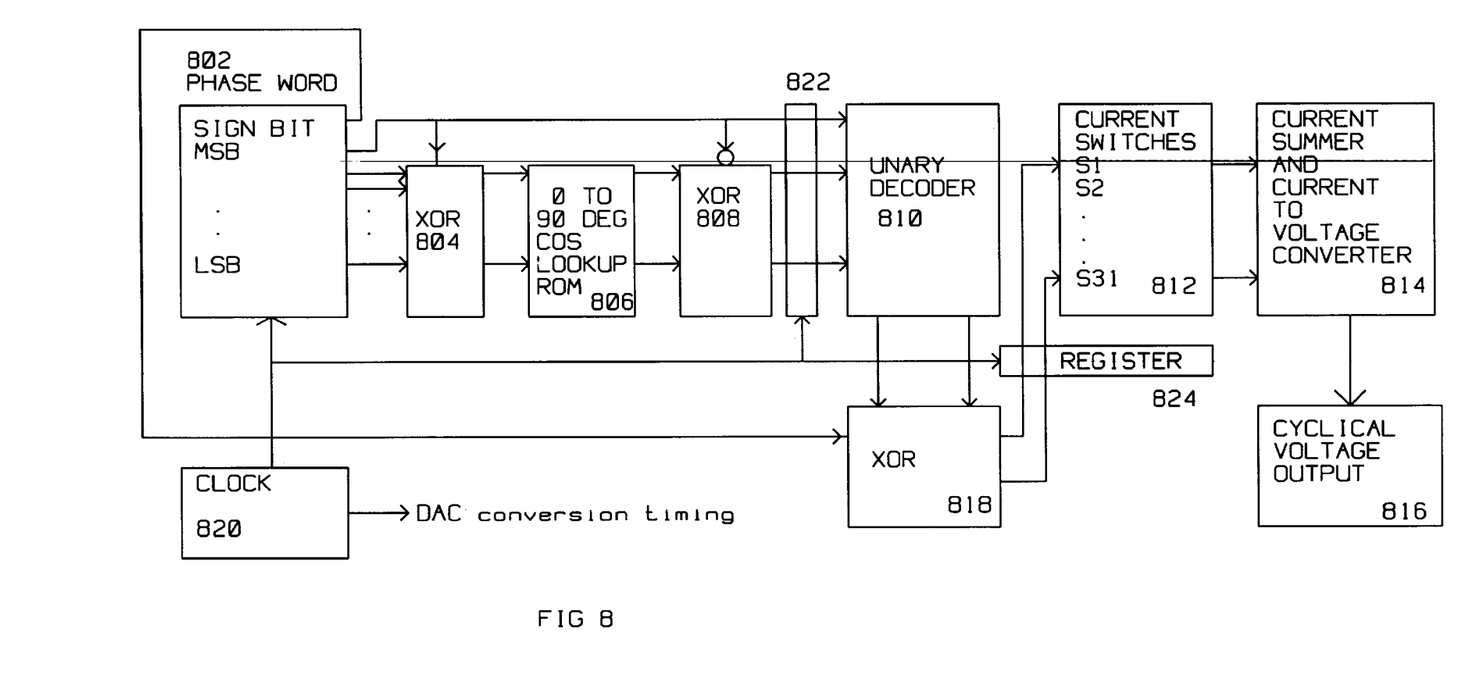
FIG. 8 is the circuit diagram of another embodiment showing operation of current switches with nearly identical duty cycle, in accordance with FIG. 5 using a cosine lookup ROM.

While FIG. 6 represent the preferred embodiment, FIG. 8 shows another embodiment of the invention. FIG. 8 describes an digital to analog converter for generating cyclical waveforms having a period. The digital to analog converter comprises:

a) A clock 820 for operating the digital to analog converter. The clock generates a clock pulse for conversion of each of the digital phase words.

b) A lookup read only memory 806 for converting each of the incrementing digital phase words within the period into a plurality of ON commands as shown in FIG. 5, to be used by a plurality of current sources S1, S2 . . . S31 within 812. The plurality of ON commands are timed to generate the cyclical waveforms. The ON commands have nearly equal time duration and are staggered to accommodate the non-linearities of the cyclical waveform to be converted. For a cosine wave, ROM 806 stores information between 0 and 90 degrees.

c) a first exclusive - OR circuit 818, having a first input, a second input and an output, said first input connected to said sequence of ON commands originating from said lookup ROM 606, subsequently combined with MSB by XOR 808 and unary decoder 810. The second input connected the sign bit of the incrementing digital phase word. The output of XOR 818 is connected to current switches U1, U2 . . . U31 in buffer 812.

d) Buffer 812 stores the output from the first exclusive - OR circuit 818 for the duration of one clock cycle. The buffer 812 drives the current switches S1, S2 . . . S31 thereby activating each for nearly equal time intervals during the period of the cyclical waveform.

e) A summer 814 sums the current sources into a sum of currents and a current to voltage converter converts the sum of currents into an output voltage. The sequential generation of the each output voltage in response to each phase word generates the cyclical waveform.

Intermediate values of digital words may be stored in registers, such as register 822 and register 824. These are driven by clock 820 and provide intermediate storage of intemediate values of digital words internal to the DAC.

Generally, the digital to analog converter will generate a cyclical waveform having one or more non-linear portions, as reflected in the content of read only memory 806.

More details about digital circuits, and the exclusive Or function is contained in *Introduction to Switching Theory and Logical Design,* by Frederick J. Hill and Gerald Peterson, John Wiley and Son, 1968 incorporated herein in its entirety by reference.

Although presented in exemplary fashion employing specific embodiments, the disclosed structures are not intended to be so limited. For example, while only a 5 bit example is discussed for convenience, the concepts herein can be extended to any number of bits. The concept can also be extended to analog to digital converters (ADC) where a DAC is generally part of the ADC, and to reduce uneven loading on ADC comparators.

Those skilled in the art will also appreciate that numerous changes and modifications could be made to the embodiment described herein without departing in any way from the invention. These changes and modifications and all obvious variations of the disclosed embodiment are intended to be embraced by the claims to the limits set by law.

What is claimed is:

1. A digital to analog converter for generating analog cyclical waveforms having a period, said cyclical waveforms generated by conversion of a sequence of step wise linearly incrementing digital phase words during said period, said digital to analog converter comprising:

a clock for operating said digital to analog converter, said clock generating a clock pulse for conversion of each of said digital phase words by said digital to analog converter while generating said cyclical waveform;

a lookup read only memory for converting each of said incrementing digital phase words within said period into a plurality of ON commands to be used by a plurality of current sources, said plurality of ON commands timed to generate said cyclical waveforms, said ON commands having equal time duration;

a first exclusive - OR circuit having a first input, a second input and an output, said first input connected to said sequence of ON commands from said lookup table, said sequence of ON commands generated using a second exclusive OR circuit and a unary decoder, said second input connected to said incrementing digital phase words, said output connected to a register buffer;

said register buffer for storing said output from said first exclusive - OR circuit for the duration of one said clock cycle;

said register buffer driving said current sources thereby activating each of said current sources for equal time intervals during said period;

a summer for summing said current sources into a sum of currents, said current sources activated from said output of said buffer;

a current to voltage converter for converting said sum of currents into an output voltage, said output voltage generating said cyclical waveform.

2. A digital to analog converter as claimed in claim 1 wherein said cyclical waveform has one or more non-linear portions reflected in the content of said read only memory.

3. A digital to analog converter as claimed in claim 1 wherein said cyclical waveform has an upper portion and a lower portion, said upper portion a mirror image of said lower portion, thus allowing storage of non-linear information within said read only memory.

4. A digital to analog converter as claimed in claim 1 wherein said lookup read only memory stores nonlinear values between 0 and 90 degrees of phase.

5. A digital to analog converter as claimed in claim 1 wherein said cyclical waveform is a sine wave.

6. A digital to analog converter as claimed in claim 1 wherein said cyclical waveform is a cosine wave.

7. A method for converting a sequence of step wise incrementing digital phase words into a cyclical analog waveform having a period within a digital to analog converter, comprising the steps of:

generating a clock pulse for conversion of each of said digital phase words by said digital to analog converter while generating said cyclical waveform;

converting each of said incrementing digital phase words within said period into a plurality of ON commands to be used by a plurality of current sources, said plurality of ON commands timed to generate said cyclical waveforms, said ON commands having equal time duration;

said converting step using a first exclusive - OR circuit having a first input, a second input and an output, said first input connected to said sequence of ON commands from a lookup table storing coefficients describing said analog waveform corresponding to each of said digital phase words, said second input connected to said incrementing digital phase words, said output connected to a buffer;

storing said output from said exclusive - OR circuit in said buffer for the duration of one said clock cycle;

driving said current sources from said buffer thereby activating each of said current sources for equal time intervals during said period;

summing said current sources into a sum of currents;

converting said sum of currents to an output voltage, said output voltage generating said analog cyclical waveform.

8. A method as claimed in claim 7 wherein said converting step uses one or more non-linear portions of said cyclical waveform reflected in the content of said read only memory.

9. A method as claimed in claim 8 wherein said converting step uses as an input to said exclusive or circuit a sign bit associated with one or more of said incremental digital phase words.

10. A method as claimed in claim 7 wherein said cyclical waveform has an upper portion and a lower portion, said upper portion a mirror image of said lower portion.

* * * * *